March 25, 1969  A. W. NELSON  3,434,608
AUTOMOBILE TOWING DEVICE
Filed Aug. 7, 1967  Sheet 1 of 2
FIG. 1
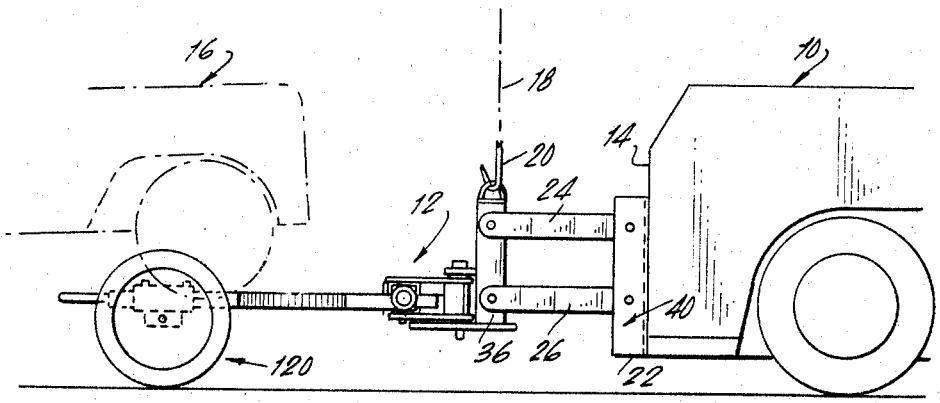
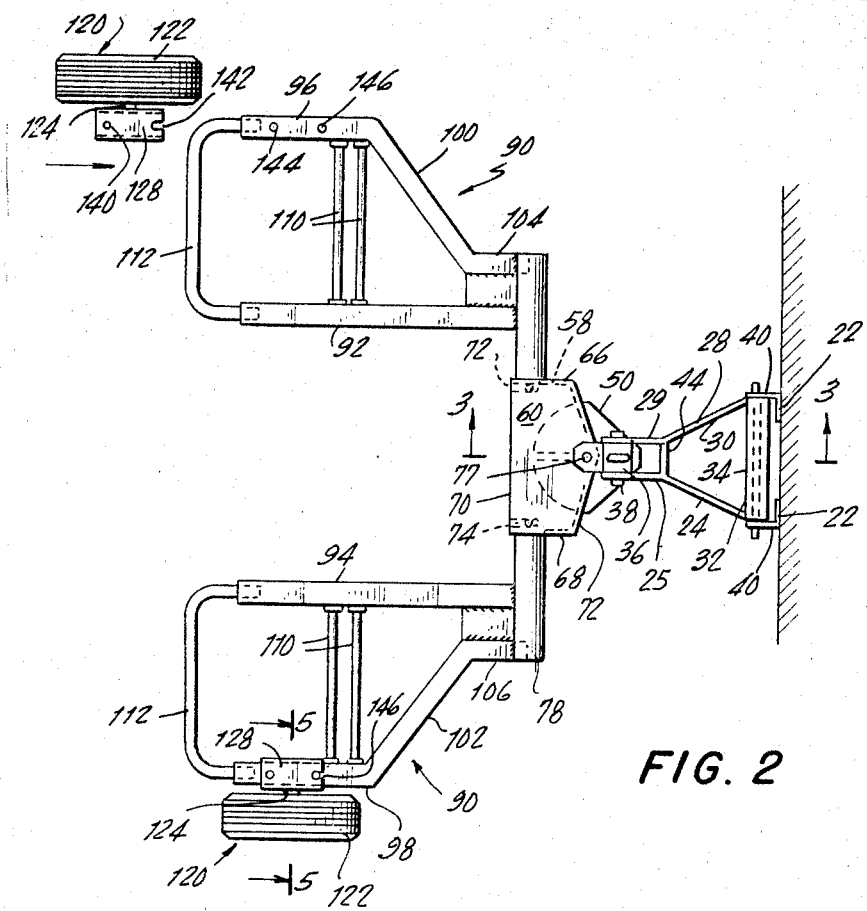
FIG. 2
INVENTOR.
ARTHUR W. NELSON
BY Friedman & Goodman
ATTORNEYS

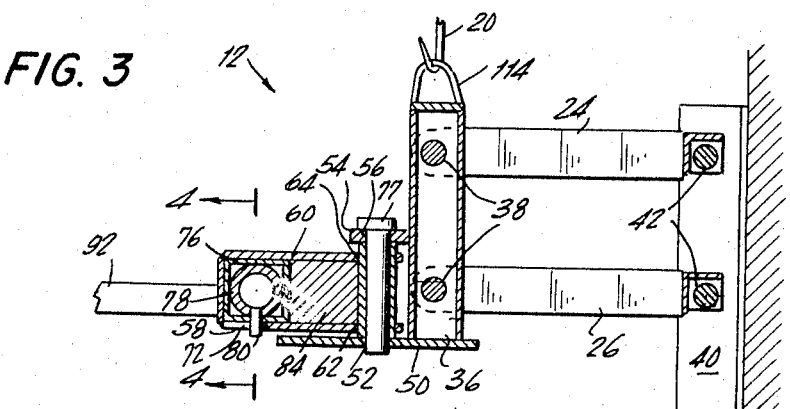
FIG. 3
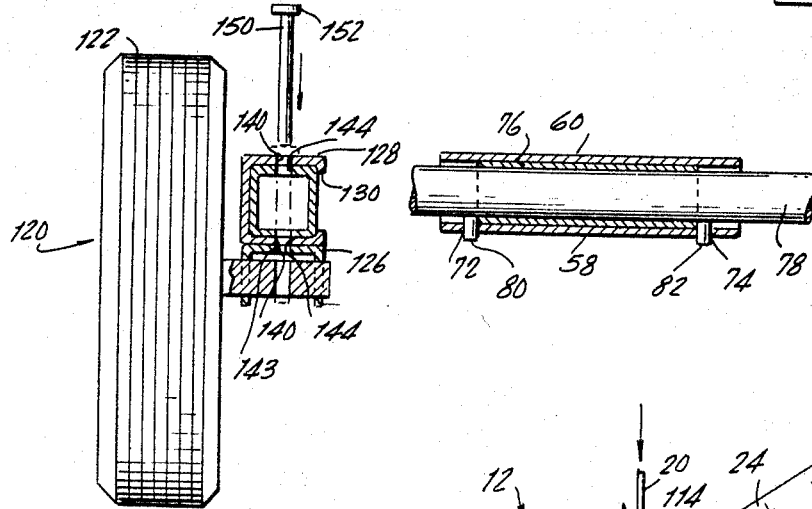
FIG. 4
FIG. 5
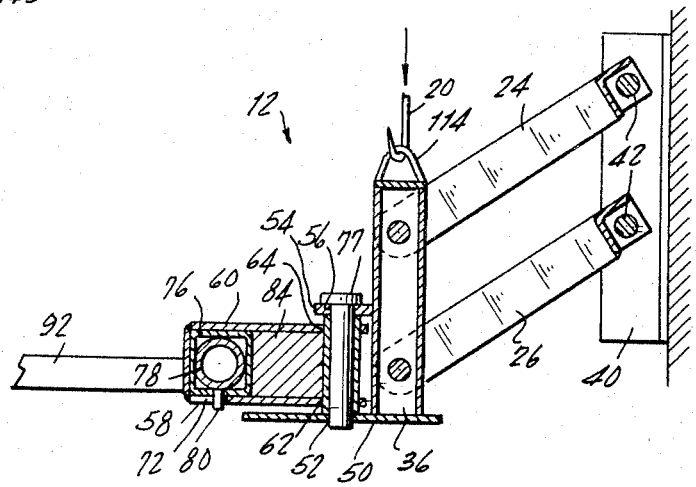
FIG. 6

United States Patent Office 3,434,608
Patented Mar. 25, 1969

3,434,608
AUTOMOBILE TOWING DEVICE
Arthur W. Nelson, 276 Long Island Ave.,
Wyandanch, N.Y. 11798
Continuation-in-part of application Ser. No. 611,386, Jan. 24, 1967. This application Aug. 7, 1967, Ser. No. 658,739
Int. Cl. B66c; B62d 21/14; B62b 1/04
U.S. Cl. 214—86                                                7 Claims

ABSTRACT OF THE DISCLOSURE

This invention is concerned with providing an improved towing device for an auto wrecker in which the towing receiving means of said device are adapted to be provided with additional support means when the towing receiving means are engaged in raising and towing a disabled vehicle. The additional support means comprise carriage means in which a pair of tires are individually and separately mounted to suitable channel members therefor, said channel members being adapted to overlie a portion of the towing receiving means.

CROSS-REFERENCE TO RELATED APPLICATIONS

The subject application is a continuation-in-part of copending U.S. application Ser. No. 611,386, filed Jan. 24, 1967.

BACKGROUND OF THE INVENTION

Field of the invention

This invention relates generally to an improved towing device for an auto wrecker. More particularly, this invention relates to a towing device provided with additional support means.

Description of the prior art

My said copending application, mentioned hereinabove, describes an improved automobile towing device for an auto wrecker. However, it is a disadvantage of that towing device as well as of the prior art towing devices that when a disabled vehicle is placed on the towing receiving means therefor and the vehicle is raised by means of the winch drive connected to the towing device, there is a weight imposed on the extra long overhang which tends to make the front of the truck light. Thus, there is an unequal distribution of weight throughout the wrecker so that there is a force ending to raise the front of the auto wrecker.

SUMMARY OF THE INVENTION

It is, therefore, among one of the principal objectives of the invention to provide additional support means for towing devices affixed to auto wreckers which will relieve the weight that is imposed on the overhang and thus increase the weight distribution in the front of the truck.

In accordance with the present invention an improved towing device has been devised in which the towing receiving means thereof are adapted to be provided with additional support means when said towing receiving means are engaged in raising and towing a disabled vehicle, said additional support means comprising, in turn, carriage means in which a pair of tires are individually and separately mounted to channel members therefor, said channel members being adapted to overlie associatingly adapted portions of said towing receiving means.

BRIEF DESCRIPTION OF THE DRAWING

The invention will be hereinafter more fully described with reference to the accompanying drawing, in which:

FIGURE 1 is a side elevational fragmentary view showing the relative positions of the auto wrecker, improved towing device and a vehicle mounted thereon, with the vehicle shown by phantom lines;

FIGURE 2 is a top plan view showing the invention device with one wheel shown mounted thereon and an opposing wheel in a sliding disengaged position;

FIGURE 3 is a view in cross-section taken along line 3—3 of FIG. 2 in the direction of arrows below the numerals, with the towing device shown in the raised position;

FIGURE 4 is a view in cross-section taken along line 4—4 of FIG. 3, in the direction of the arrows adjacent to the numerals;

FIGURE 5 is a view in cross-section taken along line 5—5 of FIG. 2 in the direction of the arrows adjacent to the numerals; and FIGURE 6 is a view in cross-section similar to FIG. 3, except that the towing device is shown in the lowered position.

DESCRIPTION OF THE PREFERRED EMBODIMENTS

Referring now to the figures of the drawing, for purposes of illustration FIG. 1 depicts an auto wrecker 10 (hereinafter sometimes referred to as a wrecker), the towing device 12 mounted in spaced relationship upon the back plate 14 of said wrecker 10 by means such as welding, riveting, bolting, or the like. A disabled vehicle 16 (shown by phantom lines) is shown mounted on said towing device 12. The wrecker 10 is of a conventional type and is provided with a derrick or crane or winch drive (not shown) or the like, from which a lifting cable 18 (dotted lines) extends and is adapted to be raised and lowered as required in use. A hook 20 is secured to said lifting cable 18. Looking now at the rest of the figures, the angle bars 22 form a rigid supporting means or structure for the device. Two pairs of opposing arms 24 and 26 and 28 and 30 extend horizontally from the said base angle bars 22 (arm 30 not being visible). Arms 24 and 28 and 26 and 30 are interconnected by means of transverse braces 32 and 34, respectively (brace 34 not being visible), said braces 32 and 34 being preferably formed of angle bars which are welded to respective arms 24 and 28 and 26 and 30 at terminal portions of said braces. The arms 24 and 26 and 28 and 30 are pivotally connected in an aligned position with vertical link 36 having planar side walls with registering apertures within which pivot pins 38 are received, the rearward portions of arms 24 and 26 and 28 and 30 receiving pivot pins 38 through similar registered apertures. The forward portions of arms 24 and 26 and 30 are pivotally connected to side plates 40 via pivotal pins 42 passing into braces 32 and 24 making braces 32 and 34 and arms 24, 26, 38 and 30 pivotally connected to side-plates 40 (FIGS. 2, 3 and 6). Looking at FIG. 2 it will be seen that the arms 24 and 28 taper inwardly towards vertical link 36 terminating at parallel opposing rear portions 25 and 29, respectively. Arms 26 and 30 are similarly defined. Another brace 44 is rigidly secured between the ends of rear portions 25 and 29 at the point where the taper of arms 24 and 28 terminates and merges integrally with portions 25 and 29. Arms 26 and 30 are similarly adapted. It will be seen that pivot pins 38 pass through registered apertures in portions 25 and 29, i.e., rearward portions of arms 24 and 28, respectively.

It is apparent, therefore, that a parallelogram type linkage is defined whereby the pivotal connection of the horizontally extending arms with the vertical link 36 limits the movement of said vertical link to a vertical plane and maintain it in substantial parallelism with angle bars 22.

The lowermost portion of vertical link 36 has secured thereto a plate 50 with a centrally located aperture 52, said plate 50 being generally fan-shaped which can readily be seen by referring to FIGS. 2, 3 and 4. A support plate 54 is also secured to vertical link 36 and has an aperture 56 therethrough which is in substantial registry with aperture 52 of plate 50. Plates 50 and 54 are secured to said vertical link by suitable means such as welding. Intermediate to plates 50 and 54 are located socket plates 58 and 60, which are advantageously formed of sheet metal, each provided with apertures 62 and 64, respectively, which are also in substantial registry with said apertures 52 and 56 mentioned above. Socket plates 58 and 60 are of a substantially similar conformation, having opposing parallel side walls 66 and 68, a bottom wall 70 at right angles thereto, and a gabled upper wall 72A, these reference numerals defining the more readily visible socket plate 60 (FIG. 2), socket plate 58 being shown by dotted lines. At opposing ends of socket plate 58 are slots 72 and 74, said slots being located along the bottom wall of plate 58, and whose function will be subsequently described. Socket plates 58 and 60 extend rearwardly and are spaced to accommodate a rotatable member receiving means in the form of a tube 76 having rectangular or cylindrical inner walls, preferably cylindrical. A rotatable member 78 is provided coursing through tube 76, said member 78 being in fixed but rotatable position within tube 76. A securing pin 77 with a suitable head is passed through apertures 56, 64, 62 and 52, respectively, thereby securing plates 54, 60, 58 and 50, said apertures being in substantial registry as described above. On either extremity of rotatable member 78 is provided a receiving means, more fully described herein below, for receiving the portion of the vehicle to be towed. Bosses 80 and 82 are provided on member 78, said bosses being in substantial registry with slots 72 and 74, respectively, of said socket plate 58, said bosses being received in said slots, with the result that while rotation of said member 78 is allowed, side-to-side slippage is prevented thereof. This can best be seen by referring to FIG. 4. Therefore, rotation of rotatable member 78 within tube 76 also results in rotation of the entire receiving means of which rotatable member 78 is a part. A stiffener plate 84 is welded to the surrounding surfaces intermediate tube 76, and plates 58 and 60.

The receiving means 90 comprise inside tubular members 92 and 94, generally parallel, having generally rectangular conformation (it is of course understood they could also be square) and similar outside tubular members 96 and 98 parallel thereto for a distance of about one-half the length of tubular members 92 and 94. The members 94 and 98 and 92 and 96 are in spaced relationship and the rearward portions (i.e. towards back plate 14) 100 and 102 of members 96 and 98, respectively, taper inwardly towards the ends of member 78, and finally merging in parallel rearmost portions 104 and 106 (parallel to 92 and 94) and rigidly secured to the outermost extremities of opposing ends of opposing ends of member 78. It will be apparent from this description that outer members 96 and 98 are outwardly displaced from the extreme opposing ends of member 78. Rotatable tire mounts 110 are rigidly affixed between 92 and 96 and 94 and 98, respectively. At the outermost ends of members 92 and 96 and 94 and 98, respectively are rigidly affixed "U" shaped tire retaining means 112, with the ends of the "U" being preferably welded inside the tubular ends of members 92, 96, 94 and 98, respectively, said retaining means 112 being preferably circular in cross-section.

Rigidly affixed to the upper end of vertical link 36 is a lifting lug 114 comprising a semi-circulated apertured body adapted to receive hook 20 secured to lifting cable 18. By this means, the apex portion of the device, including the movable link and mounted socket plates, etc., are raised or lowered as required. Thus in FIG. 6 can be seen the towing device 12 in the lowered position, the position in which it is when the disabled vehicle is mounted thereon, and in FIG. 3 can be seen the device 12 in the raised position and ready for towing the vehicle mounted thereon. It is at this phase of the towing operation (FIG. 3) that the additional support means comprising carriage means 120 are provided on the towing receiving means 90. The carriage means 120 comprise a pair of individually mounted conventional tires and wheels 122 on a rotating shaft 124 in a housing 126 therefor, said housing being generally preferably square in cross-section. Rigidly affixed atop said housing 126 is a channel member 128. Said channel member is adapted to overlie tubular members 96 and 98 respectively, said channel member 128 being adapted to slidably and detachably overlie said tubular members by means of a longitudinal cut-out portion 120 in the side wall 132 closest to members 96 and 98. It is to be noted that by virtue of the fact that cut-out portion 130 leaves upper and lower portions of side wall 132 remaining that the channel member 128 is prevented from sliding off members 96 and 98 when said carriage means are slid up over tubular members 96 and 98 in the direction of the arrow as shown in FIG. 2. The upper and lower walls of channel member 128 are provided with opposing registered apertures 140 and a slot 142 on the opposite longitudinal end of said upper wall. The apertures 140 are adapted to be in registry with like registered apertures 144 located in tubular members 96 and 98, while the slot 142 is adapted to receive a boss 146 in substantial registry thereto located on members 96 and 98. A securing pin 150 with a head 152 is passed through apertures 140 and 144 thereby detachably engaging channel member 128 and tubular members 96 and 98. Thus it can be seen by looking at FIGS. 2 and 5 that the channel member 128 overlies tubular members 96 and 98 on all sides save that adjacent cut-out portion 130 and that said channel member is prevented from sliding off laterally of tubular members 96 and 98 by overlying wall portions 132 of cut-out portion 130 until said pin 150 is inserted in the locking registered apertures, including aperture 143 of housing 126. When said carriage means 120 are detachably secured on said receiving means 90 as shown in FIG. 2, the disabled vehicle previously mounted on said receiving means when in the position shown by FIG. 3 is then ready for towing as illustrated by FIG. 1.

The tires and wheels 122 while conventional are of generally smaller diameter than the regular tires of the towing vehicle 10. Thus it can be readily seen by referring to FIG. 1 again that the downward force exerted on the towing device 12 is additionally supported by the carriage means 120 so that the force imposed on the extra long overhang (not shown), which tends to make the front of the truck light, is redistributed so that the front of the truck (also not shown) is now about three times heavier than it would be without the carriage means 120. Further, it can be seen that disabled vehicle 16 is smoothly towed on a wheel base thereby preventing jouncing or jarring to said vehicle 16. Another important advantage gained by the invention is that the inventive device can be installed on small ½, ¾ and one ton pickup trucks which are used quite extensively by service stations, garages and auto dealers in making service calls. With the subject device only one man is required to pick up a car for service. Still another important advantage of the invention is that the device is relatively inexpensive when compared to other towing devices extant.

Describing in summary the sequence of the towing operation described, the disabled vehicle 16 is mounted on receiving means 90 when they are in the lowered position as shown by FIG. 6. Thereafter the receiving means are raised by the derrick means to the position as shown by FIG. 3. FIG. 2 describes the next step of affixing the carriage means 120 to the receiving means 90 and finally FIG. 1 shows the disabled vehicle 16 in position ready to be towed by the improved inventive towing device 12 rigidly secured to wrecker 10.

Having thus described the invention in a specific embodiment thereof, it is to be understood that changes may be made by those skilled in the art without departing from the spirit and scope thereof.

I claim:

1. An improved towing device for an auto wrecker comprising in combination towing receiving means and additional support means therefor, said towing receiving means being adapted to be provided with said additional support means when said towing receiving means are engaged in elevating and towing a vehicle thereon, said support means comprising spaced channel members and carriage means which further comprise a pair of opposingly mounted tires and wheels individually mounted to the channel members, said channel members being removably detachable from said towing receiving means and adapted to overlie associatingly adapted portions of said towing receiving means and means for attaching said channel members to the towing receiving means.

2. A towing device for an auto wrecker comprising in combination towing receiving means and additional support means therefor, said towing receiving means being adapted to be provided with said additional support means when said towing receiving means are engaged in elevating and towing a vehicle thereon, said support means comprising spaced channel members and carriage means which further comprise a pair of opposingly mounted tires and wheels mounted to the channel members, said channel members being removably detachable from said towing receiving means and adapted to overlie associatingly adapted portions of said towing receiving means so that the downward force on said towing receiving means and elevating means therefor which tends to render the front of the auto wrecker lighter in weight is substanitially reduced, said downward force being exerted by the vehicle to be towed mounted on said towing receiving means and means for attaching said channel members to the towing receiving means.

3. A towing device according to claim 2, wherein said channel members and said towing receiving means are slidably detached.

4. An improved towing device for an auto wrecker comprising in combination towing receiving means and additional support means therefor, said towing receiving means being adapted to be provided with said additional support means when said towing receiving means are engaged in elevating and towing a vehicle thereon, said support means comprising carriage means which further comprise a pair of opposingly mounted tires and wheels individually mounted to channel members therefor, said channel members being adapted to overlie associatingly adapted portions of said towing receiving means, and wherein said towing receiving means comprise opposingly parallel inside tubular members and outside tubular members parallel thereto for at least a part of the length of said inside members, said inside and outside members being secured to a rotating member therefor, each of said outside tubular members containing means for detachably engaging said carriage means.

5. A towing device according to claim 4, wherein each of said channel members are associatingly adapted to be detachably engaged to said towing receiving means, each of said outside tubular members being provided with opening means therethrough and opposing boss means, said channel member being provided with opening means therethrough adapted to be in substantial registry with said channel member being provided with opening means with receiving means adapted to be in substantial registry with said opposing boss means, a securing member passing through all of said opening means thereby connecting said outside tubular member and said channel member, said boss means being slidingly engaged in said receiving means of said channel member.

6. A towing device according to claim 4, wherein said outside tubular member is substantially rectangular in cross-section and said channel member is associatingly rectangular and sufficiently large enough to overlie said outside tubular member, said channel members being adapted to slidingly and detachably overlie said outside tubular member.

7. A towing device according to claim 6, wherein said channel member is provided with a longitudinal cut-out portion along the longitudinal wall thereof closest to said outside tubular member, so that portions of said wall overlie said outside tubular member.

References Cited

UNITED STATES PATENTS

| | | | |
|---|---|---|---|
| 2,736,567 | 2/1956 | McMurray | 280—43 XR |
| 2,757,936 | 8/1956 | McCavey et al. | 280—43.11 |
| 3,022,086 | 2/1962 | Allen | 280—30 |
| 3,051,337 | 8/1962 | Nelson | 214—86 |
| 3,152,704 | 10/1964 | Russell | 214—86 |
| 3,261,487 | 7/1966 | Talbert | 280—43.11 XR |
| 3,361,277 | 1/1968 | Johnson et al. | 280—402 XR |

ALBERT J. MAKAY, Primary Examiner.

U.S. Cl. X.R.

280—43